Jan. 2, 1968     R. MILLER     3,361,010

TRANSMISSION APPARATUS FOR TRANSMITTING ROTARY MOTION

Filed Feb. 23, 1966

INVENTOR

ROBERT MILLER.

United States Patent Office 3,361,010
Patented Jan. 2, 1968

3,361,010
TRANSMISSION APPARATUS FOR TRANSMITTING ROTARY MOTION
Robert Miller, Hatch End, England, assignor to Bristol Siddeley Engines Limited, Bristol, England, a British company
Filed Feb. 23, 1966, Ser. No. 529,411
Claims priority, application Great Britain, Feb. 25, 1965, 8,177/65
6 Claims. (Cl. 74—810)

ABSTRACT OF THE DISCLOSURE

A mechanical transmission between two shafts having two power paths, each path including an oppositely directed one way clutch. The power paths are alternately operative depending on which of the two shafts is driving.

---

Figure 1:
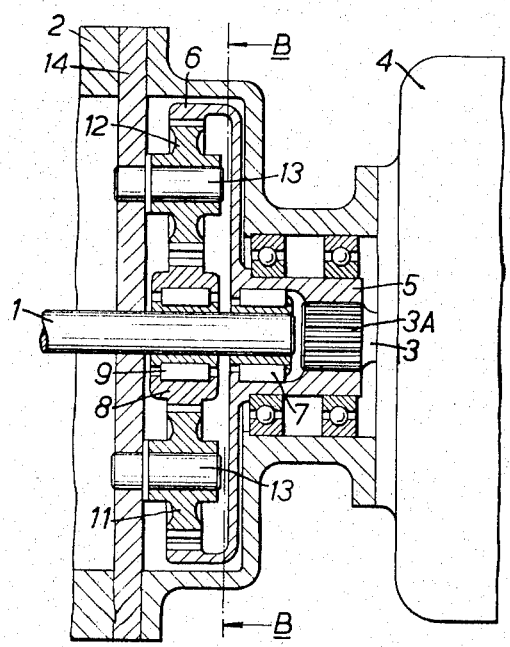

This invention relates to transmission apparatus for transmitting rotary motion between two coaxial shafts which have the same predetermined direction of rotation, and wherein the ratio of transmission is different according to whether one of the shafts or the other is at any time acting as the driving shaft, such transmission apparatus being particularly applicable, for example, where a device is provided which can be driven by an internal combustion engine or gas turbine engine to produce and store some source of power, such as electricity or fluid under pressure, while at other times it can act as a motor employing such source of power and serving to start the engine.

An object of the invention is to provide transmission apparatus of the kind referred to which is simple and compact such as to be easily accommodated, for example, in the bullet of a gas turbine engine for starting purposes.

To this end transmission apparatus according to the invention for transmitting rotary motion between first and second coaxial shafts which have the same predetermined direction of rotation, and wherein the ratio of transmission is different according to whether one of the shafts or the other is at any time acting as the driving shaft, comprises two unidirectional driving devices arranged respectively to be operative to transmit power when the first shaft and the second shaft is the driving shaft and respectively to connect the first shaft directly to a gear wheel (hereinafter referred to for convenience as the relatively small gear wheel) coaxial with the shafts, and directly to the second shaft, a gear wheel which is of large diameter relatively to said relatively small gear wheel and is directly connected to the second shaft, and intermediate gearing comprising gear wheels mounted for rotation about fixed axes and interconnecting said relatively large and relatively small gear wheels for causing rotation thereof in the same direction as one another at different speeds.

In a preferred arrangement the relatively small gear wheel is in the form of an external spur gear while the gear wheel of relatively large diameter is in the form of an internally toothed ring constituting an internal spur gear, the intermediate gearing comprising at least one pair of intermeshing external spur gears mounted for rotation about fixed parallel axes and, in addition to meshing with each other, meshing respectively with the said internal spur gear and the said external spur gear of relatively small diameter.

Thus, when transmission apparatus according to the invention is applied to the transmission of rotation between an engine shaft (such as the appropriate shaft of a gas turbine engine) and an electrodynamic device which can alternatively act as an electric generator charging a battery and as an electric starter motor for starting the engine, or between an engine shaft and a hydraulic device which can act alternatively as a pump charging a source of fluid pressure and as a hydraulic motor for starting the engine, the shaft to which the smaller gear wheel is connected by one of the unidirectional driving devices will be a shaft directly connected to the engine shaft so that when the engine is in operation that unidirectional driving device will be operative to transmit power to the relatively small gear wheel and hence via the intermediate gearing and the relatively large gear wheel to the shaft of the hydraulic device or the electrodynamic device, which will thereby be driven at an appropriate speed in spite of the high working speed of the engine, the other unidirectional driving device over running. When on the other hand the engine is stationary and is to be started by the hydraulic device or the electrodynamic device acting as a motor, the said other unidirectional driving device will be operative to connect the shaft of the hydraulic or electrodynamic device acting as a motor, directly to the engine shaft and thus rotate the engine shaft to start the engine, the first unidirectional driving device then over running. It will be apparent that as soon as the engine has started and reached the appropriate speed the hydraulic device or the dynamo-electric device no longer acts as a motor and the engine will drive the hydraulic or dynamo-electric device at the appropriate speed to re-charge the source of pressure fluid, or the battery, as the case may be.

Figure 2:
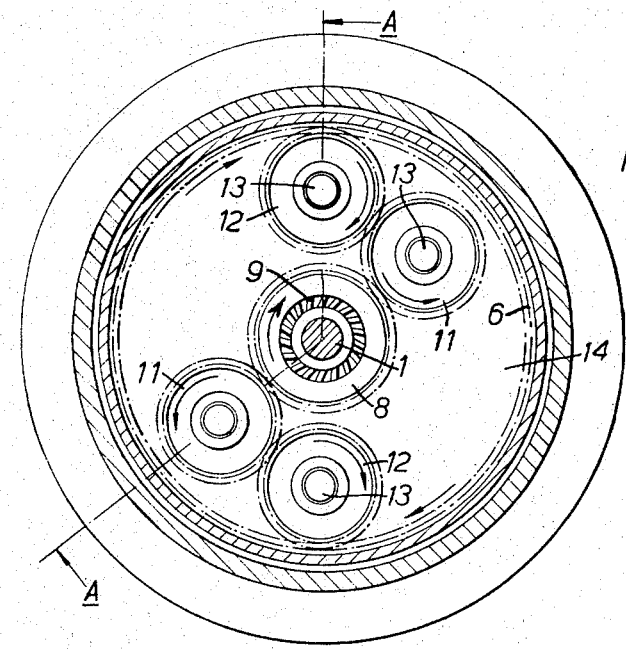

One construction of transmission apparatus according to the invention is shown somewhat diagrammatically in the accompanying drawings, in which;

FIGURE 1 is a sectional side elevation of the transmission apparatus in the broken plane A—A, indicated on FIGURE 2, and FIGURE 2 is a cross-section in the plane indicated at B—B on FIGURE 1.

In the construction shown in the drawings the apparatus comprises a shaft 1, which is to be assumed to be permanently connected to some rotary part of an engine such as a gas turbine engine the casing of which is shown at 2, and a shaft 3 coaxial with the shaft 1 and constituting the shaft of a dual purpose machine 4 which may be a dynamo-electric machine capable of acting alternatively as a motor and a generator charging a battery or a hydraulic machine capable of acting alternatively as a hydraulic motor or a fluid pump charging a pressure reservoir. The shaft 3 is permanently directly connected by means of a splined end 3A to the hub 5 of an internal gear 6 of relatively large diameter, which is also arranged to be connected directly to the shaft 1 through a unidirectional driving device indicated at 7, this device being for example of the well known jamming roller type or the known tangential strut type indicated. The shaft 1 is also arranged to be connected directly to a relatively small external spur gear 8 by means of a second unidirectional driving device 9, also of the known jamming roller or tangential strut type and operative to transmit rotation in the opposite direction from the device 7, while the spur gear 8 is connected to the internal gear 6 by means of two pairs of gears rotatably supported on fixed axles 13 from a plate 14 rigid with the casing 2 and each comprising two intermeshing gears 11 and 12, of which the gear 11 of each pair meshes with the gear 8 and the gear 12 of each pair meshes with the gear 6. The directions of rotation of the various gears are as indicated by arrows in FIGURE 2, and the arrangement is such that when the shaft 1 constitutes the driving shaft, as when the engine is in operation, the unidirectional driving device 9 is operative to transmit power through the gears 8 and 11 and 12 to the gear 6, and hence to the shaft 3, at a relatively low ratio the unidirectional driving device 7 over-running, whereas when the engine is out of operation and the shaft 3 is rotated by the hydraulic or dynamo-electric device 4 acting as a motor the unidirectional driving device 7 is operative and the unidirectional driving device 9 is over-running so that power is transmitted directly from the shaft 3 via the hub 5 and device 7 to the shaft 1, the gears 8, 11, 12, and 6 rotating but not transmitting power.

It will also be seen that when the uni-directional driving device 7 is in operation providing a direct drive, all the gearing in the apparatus will be "idle" and the torque which the device 7 has to transmit will be the torque transmitted directly from the shaft 3 to the shaft 1, i.e. the minimum torque consistent with the 1 to 1 transmission ratio then in operation. Further, when the uni-directional driving device 9 is in operation, since this device then transmits torque between the shaft 1 and the small gear wheel 8 by which power is transmitted through the intermediate gears 11, 12 to the large gear wheel 6, the unidirectional driving device 9 will also be subject to the minimum torque at any point in the transmission train.

What I claim as my invention and desire to secure by Letters Patent is:

1. Transmission apparatus for transmitting rotary motion comprising coaxial first and second shafts having the same predetermined direction of rotation, a relatively small gear wheel coaxial with said shafts, two unidirection driving devices arranged to be operative to transmit power respectively when the first shaft is the driving shaft and when the second shaft is the driving shaft and respectively to connect said first shaft directly to said relatively small gear wheel and to connect said first shaft directly to the second shaft, a gear wheel which is of large diameter relative to said relatively small gear wheel and is directly connected to the second shaft, and intermediate gearing comprising gear wheels mounted for rotation about fixed axis and interconnecting said relatively large and relatively small gear wheels for causing rotation thereof in the same direction as one another at different speeds.

2. Transmission apparatus as claimed in claim 1 in which the relatively small gear wheel is in the form of relatively small external spur gear while the gear wheel of relatively large diameter is in the form of an internally toothed ring constituting an internal spur gear the intermediate gearing comprising at least one pair of intermeshing external spur gears mounted for rotation about fixed parallel axes and, in addition to meshing with each other, meshing respectively with the said internal spur gear and the said relatively small external spur gear.

3. The combination with transmission apparatus as claimed in claim 2 of an engine shaft to which rotation is to be imparted to start an engine, and an electro dynamic device which can alternatively act as an electric generator charging a battery and as an electric starter motor, the said engine shaft being connected through one of said unidirectional devices to the relatively small external spur gear and through the other of said unidirectional driving devices to the internal spur gear while the internal spur gear is directly connected to the shaft of said electro dynamic device.

4. The combination with transmission apparatus as claimed in claim 1 of an engine shaft to which rotation is to be imparted to start an engine, and an electro dynamic device which can alternatively act as an electric generator charging a battery and as an electric starter motor, the said engine shaft being connected through one of said unidirectional devices to the relatively small gear wheel and through the other of said unidirectional driving devices to the gear wheel of relatively large diameter while the gear wheel of relatively larger diameter is directly connected to the shaft of said electro dynamic device.

5. The combination with transmission apparatus as claimed in claim 1 of an engine shaft to which rotation is to be imparted to start the engine, and a hydraulic device which can alternatively act as a pump and as a hydraulic starter motor for the engine, the said engine shaft being connected through one of said unidirectional driving devices to the relatively small gear wheel and through the other of said unidirectional driving devices to the gear wheel of relatively large diameter, while the gear wheel of relatively large diameter is directly connected to the shaft of the hydraulic device.

6. The combination with transmission apparatus as claimed in claim 2 of an engine shaft to which rotation is to be imparted to start the engine, and a hydraulic device which can alternatively act as a pump and as a hydraulic starter motor for the engine, the said engine shaft being connected through one of said unidirectional driving devices to the relatively small external spur gear and through the other of said unidirectional driving devices to the internal spur gear while the internal spur gear is directly connected to the shaft of the hydraulic device.

References Cited

UNITED STATES PATENTS

| | | | |
|---|---|---|---|
| 1,080,642 | 12/1913 | MacFarland | 74—810 |
| 1,159,752 | 11/1915 | Fisher | 74—810 X |
| 1,164,280 | 12/1915 | Halbleib et al. | 74—810 X |
| 2,600,762 | 6/1952 | Hartz | 74—810 |
| 3,307,426 | 3/1967 | Whitaker | 74—810 X |

ROBERT A. O'LEARY, *Primary Examiner.*

T. C. PERRY, *Assistant Examiner.*